(12) United States Patent
Ohira et al.

(10) Patent No.: US 12,158,656 B2
(45) Date of Patent: Dec. 3, 2024

(54) DISPLAY DEVICE AND MIRROR DEVICE

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

(*) Notice: Subject to any disclaimer, the term of this patent is extended or adjusted under 35 U.S.C. 154(b) by 595 days.

(21) Appl. No.: 17/472,695

(22) Filed: Sep. 13, 2021

(65) Prior Publication Data

US 2021/0405445 A1 Dec. 30, 2021

Related U.S. Application Data

(63) Continuation of application No. PCT/JP2020/002627, filed on Jan. 24, 2020.

(30) Foreign Application Priority Data

Mar. 15, 2019 (JP) .................. 2019-048901

(51) Int. Cl.
*G02F 1/1335* (2006.01)
*B60R 1/08* (2006.01)
*B60R 1/12* (2006.01)

(52) U.S. Cl.
CPC ........ *G02F 1/133553* (2013.01); *B60R 1/088* (2013.01); *B60R 1/12* (2013.01); *B60R 2001/1253* (2013.01); *B60R 2300/8046* (2013.01)

(58) Field of Classification Search
CPC .......... G02F 1/133553; G02F 1/13471; B60R 1/088; B60R 1/12; B60R 2001/1253; B60R 2300/8046
See application file for complete search history.

(56) References Cited

U.S. PATENT DOCUMENTS

| 4,729,638 A | 3/1988 | Shirai |
| 2004/0100598 A1* | 5/2004 | Adachi ............... G02F 1/13362 349/113 |

(Continued)

FOREIGN PATENT DOCUMENTS

| JP | 58-168777 U | 11/1983 |
| JP | 61-70833 U | 5/1986 |

(Continued)

OTHER PUBLICATIONS

Office Action issued Sep. 6, 2022 in Japanese Patent Application No. 2019-048901, 9 pages.

(Continued)

*Primary Examiner* — Joseph P Martinez
*Assistant Examiner* — Ray Alexander Dean
(74) *Attorney, Agent, or Firm* — XSENSUS LLP

(57) ABSTRACT

A display device includes a display panel, and a front panel overlapping with the display panel. The front panel includes a first substrate, and a second substrate located on an opposite side of the first substrate with respect to the display panel, the front panel has an active region capable of being switched between a display state in which an image is displayed and a reflection state in which a reflected image is provided, and a frame region around the active region, and a metal layer is arranged in the frame region of the second substrate.

8 Claims, 12 Drawing Sheets

(56) References Cited

U.S. PATENT DOCUMENTS

| | | | | |
|---|---|---|---|---|
| 2013/0107563 A1* | 5/2013 | McCabe | ................. | G02B 5/10 |
| | | | | 362/540 |
| 2016/0026039 A1 | 1/2016 | Sakai et al. | | |
| 2018/0072227 A1* | 3/2018 | Kato | ........................ | B60R 1/26 |
| 2020/0027406 A1 | 1/2020 | Kanazawa et al. | | |

FOREIGN PATENT DOCUMENTS

| | | | | |
|---|---|---|---|---|
| JP | 61-93430 A | 5/1986 | | |
| JP | 1-172029 U | 12/1989 | | |
| JP | 2001-318374 A | 11/2001 | | |
| JP | 2018-171982 A | 11/2018 | | |
| WO | WO-2014112525 A1 * | 7/2014 | ....... | G02F 1/133308 |

OTHER PUBLICATIONS

International Search Report and Written Opinion mailed on Mar. 3, 2020, received for PCT Application PCT/JP2020/002627, Filed on Jan. 24, 2020, 12 pages including English Translation.

* cited by examiner

DISPLAY DEVICE AND MIRROR DEVICE

CROSS-REFERENCE TO RELATED APPLICATIONS

This application is a continuation of International Patent Application No. PCT/JP2020/002627 filed on Jan. 24, 2020 which designates the United States, incorporated herein by reference, and which claims the benefit of priority from Japanese Patent Application No. 2019-048901 filed on Mar. 15, 2019, incorporated herein by reference.

BACKGROUND

1. Technical Field

The present disclosure relates to a display device and a mirror device that are brought into a reflection state in which incident light is reflected and a transmission state in which incident light is transmitted and an image is able to be displayed.

2. Description of the Related Art

Japanese Patent Application Laid-open Publication No. 2001-318374 (JP-A-2001-318374) describes a device capable of being switched between a display state in which an image is displayed and a mirror state (reflection state) in which a reflected image is provided.

In the display device in JP-A-2001-318374 has an active region capable of being switched between the display state in which an image is displayed and the mirror state (reflection state) in which a reflected image is provided. The display state and the mirror state have the same area.

An object of the present disclosure is to provide a display device and a mirror device in which an area in a mirror state is larger than an area in a display state.

SUMMARY

A display device according a first embodiment includes a display panel, and a front panel overlapping with the display panel. The front panel includes a first substrate, and a second substrate located on an opposite side of the first substrate with respect to the display panel, the front panel has an active region capable of being switched between a display state in which an image is displayed and a reflection state in which a reflected image is provided, and a frame region around the active region, a metal layer is arranged in the frame region of the second substrate, and a thickness of the first substrate is equal to or smaller than 0.4 mm.

A display device according to a second embodiment includes a display panel, and a front panel overlapping with the display panel. The front panel includes a first substrate, and a second substrate located on an opposite side of the first substrate with respect to the display panel, the front panel has an active region capable of being switched between a display state in which an image is displayed and a reflection state in which a reflected image is provided, and a frame region around the active region, a metal layer is arranged in the frame region of the second substrate, and a thickness of the first substrate is smaller than a thickness of the second substrate.

A mirror device according to other embodiment is brought into a reflection state in which incident light is reflected and a transmission state in which incident light is transmitted and an image is able to be displayed. The mirror device includes the display device above, and a shooting device shooting an image of a rear part of a vehicle.

DETAILED DESCRIPTION

Figure 1:
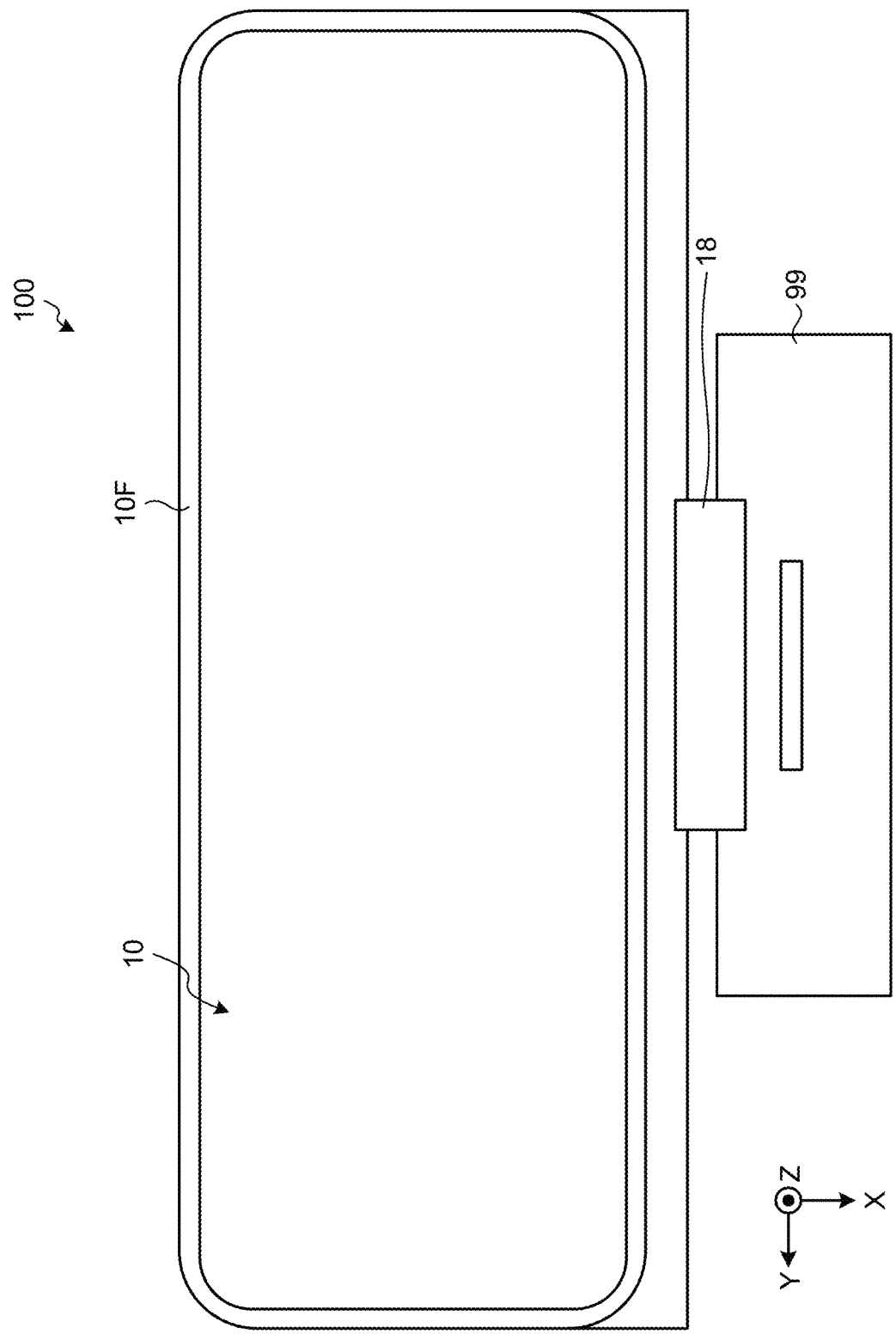
FIG. 1 is a schematic plan view for explaining an active region of a display device according to the present embodiment.

A mode for carrying out the present disclosure (embodiment) will be described in detail with reference to the drawings. Contents described in the following embodiment do not limit the present disclosure. Components described below include those that can be easily thought of by those skilled in the art and substantially the same components. Furthermore, the components described below can be combined as appropriate. What is disclosed herein is merely an example, and appropriate modifications within the gist of the disclosure at which those skilled in the art can easily arrive are naturally encompassed in the scope of the present disclosure. In the drawings, widths, thicknesses, shapes, and the like of the components can be schematically illustrated in comparison with actual modes for clearer explanation. They are however merely examples and do not limit interpretation of the present disclosure. In the present specification and the drawings, the same reference numerals denote components similar to those described before with reference to the drawing that has been already referred, and detail explanation thereof can be omitted as appropriate.

FIG. 1 is a schematic plan view for explaining an active region of a display device according to the present embodiment. As illustrated in FIG. 1, the display device has an active region 10 capable of being switched between a display state in which an image is displayed and a mirror state (reflection state) in which a reflected image is provided and a frame region 10F around the active region 10.

Figure 2:
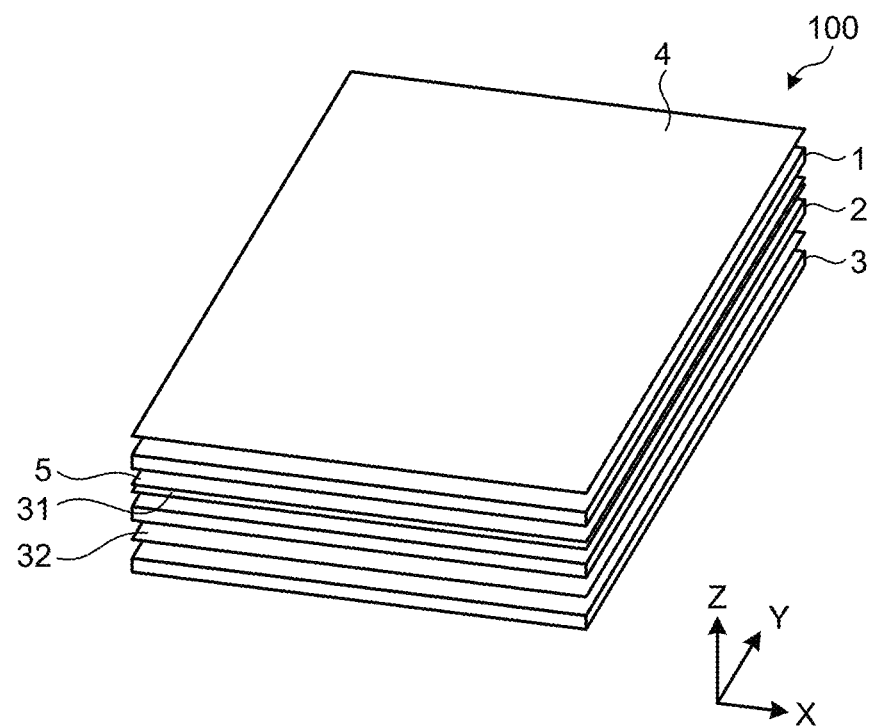
FIG. 2 is a perspective view illustrating an example of the configuration of the display device in the present embodiment.

FIG. 2 is a perspective view illustrating an example of the configuration of the display device in the present embodiment. A display device 100 includes a first polarizing member 4, a front panel 1, an optical sheet 5, a second polarizing member 31, a display panel 2, a third polarizing member 32, and a backlight 3. In FIG. 2, one direction of a plane of the display panel 2 is an X direction, a direction orthogonal to the X direction in the plane of the display panel 2 is a Y direction, and a direction orthogonal to an X-Y plane is a Z direction. A side of a display surface (or an upper surface) on which the display panel 2 displays an image when seen in the Z direction is referred to as a display surface side (or an upper surface side) and a side of a rear surface (or a lower surface) that is opposite to the display surface (or the upper surface) when seen in the Z direction is referred to as a rear surface side (or a lower surface side).

The third polarizing member 32 and the backlight 3 on the rear surface side of the display panel 2 overlap with the display panel 2 when seen in the Z direction.

The backlight 3 is an illumination device outputting light toward the display panel 2. The backlight 3 has, for example, a light source and a light guiding plate, scatters light output from the light source by the light guiding plate, and outputs the light from an output surface facing the display panel 2.

The first polarizing member 4, the front panel 1, the optical sheet 5, and the second polarizing member 31 on the display surface side of the display panel 2 overlap, in this order, with the display panel 2 in the Z direction. As described above, the front panel 1 overlaps with the display panel 2.

Figure 3:
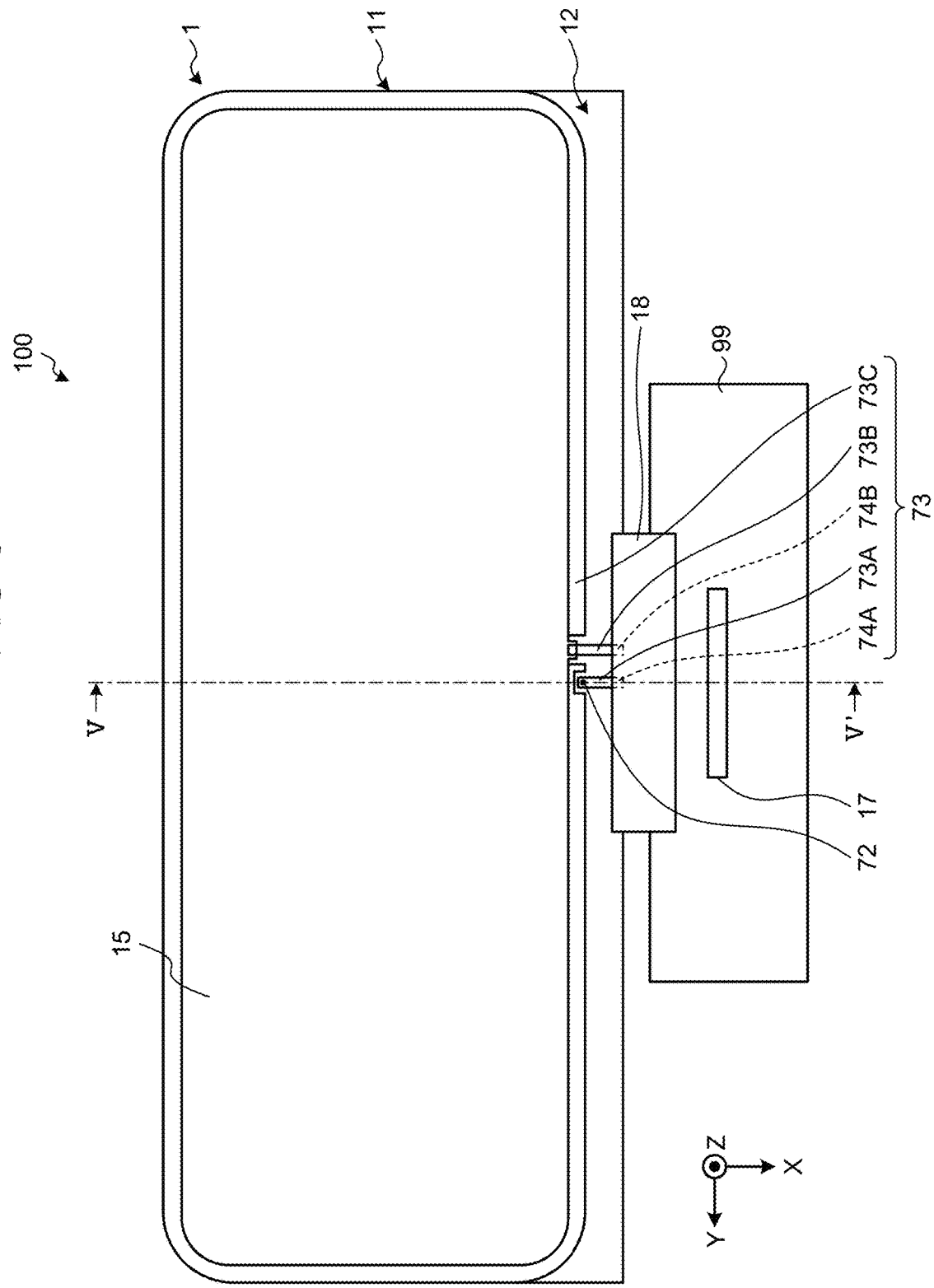
FIG. 3 is a plan view illustrating a second translucent electrode of the display device in the present embodiment.

FIG. 3 is a plan view illustrating a second translucent electrode of the display device in the present embodiment. FIG. 3 is a plan view illustrating a first translucent electrode of the display device in the present embodiment. A second translucent electrode 15 illustrated in FIG. 3 is formed on a second substrate 12 and overlaps with the active region 10 illustrated in FIG. 1. As illustrated in FIG. 3, the second translucent electrode 15 is coupled to a drive circuit 17 mounted on a printed board 99 through a flexible printed circuits (FPC) 18.

Figure 4:
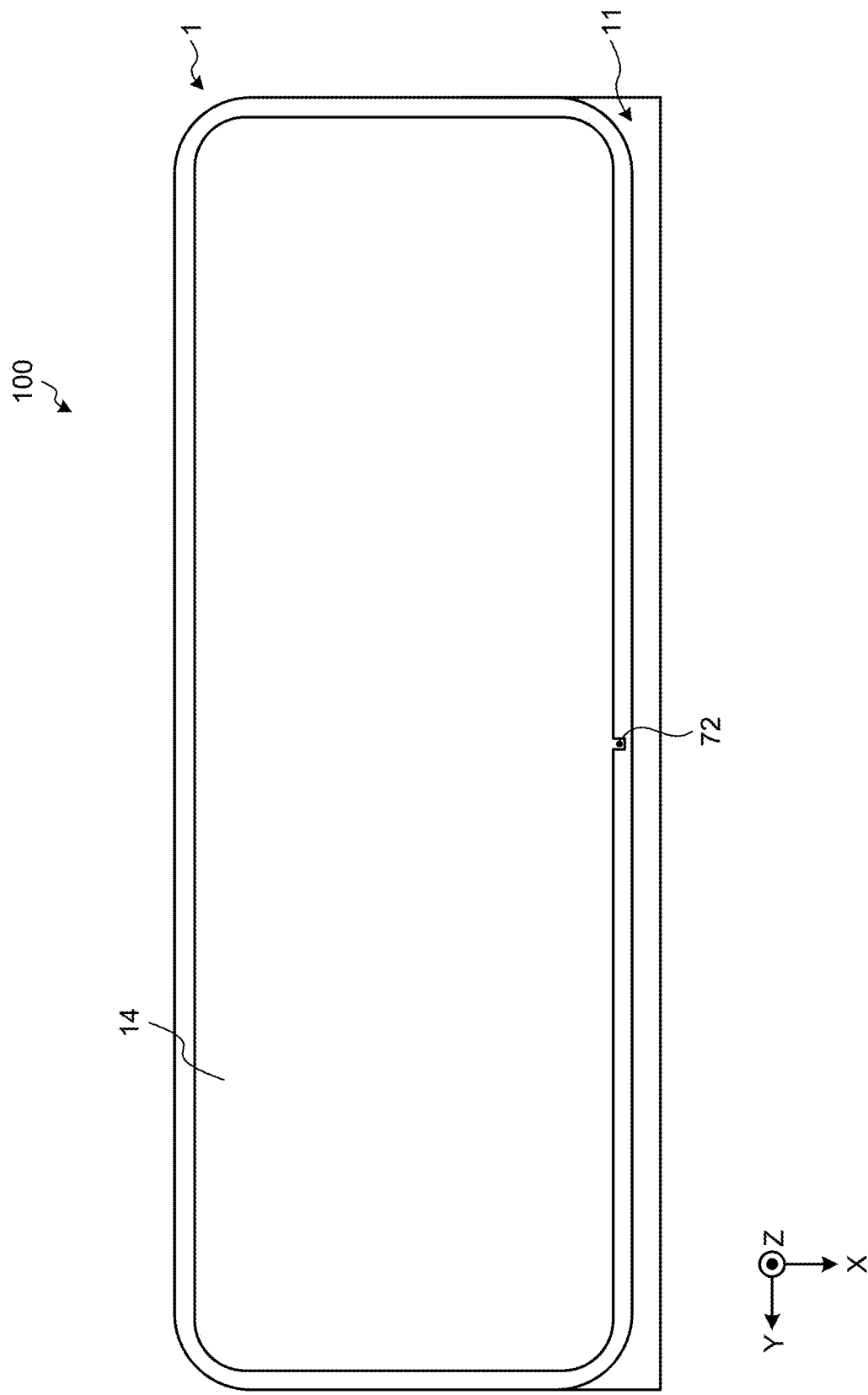
FIG. 4 is a plan view illustrating a first translucent electrode of the display device in the present embodiment.

A first translucent electrode 14 illustrated in FIG. 4 is formed on a first substrate 11 and overlaps with the active region 10 illustrated in FIG. 1. As illustrated in FIG. 4, the first translucent electrode 14 is electrically coupled to a conductive column 72, which will be described later.

Figure 5:
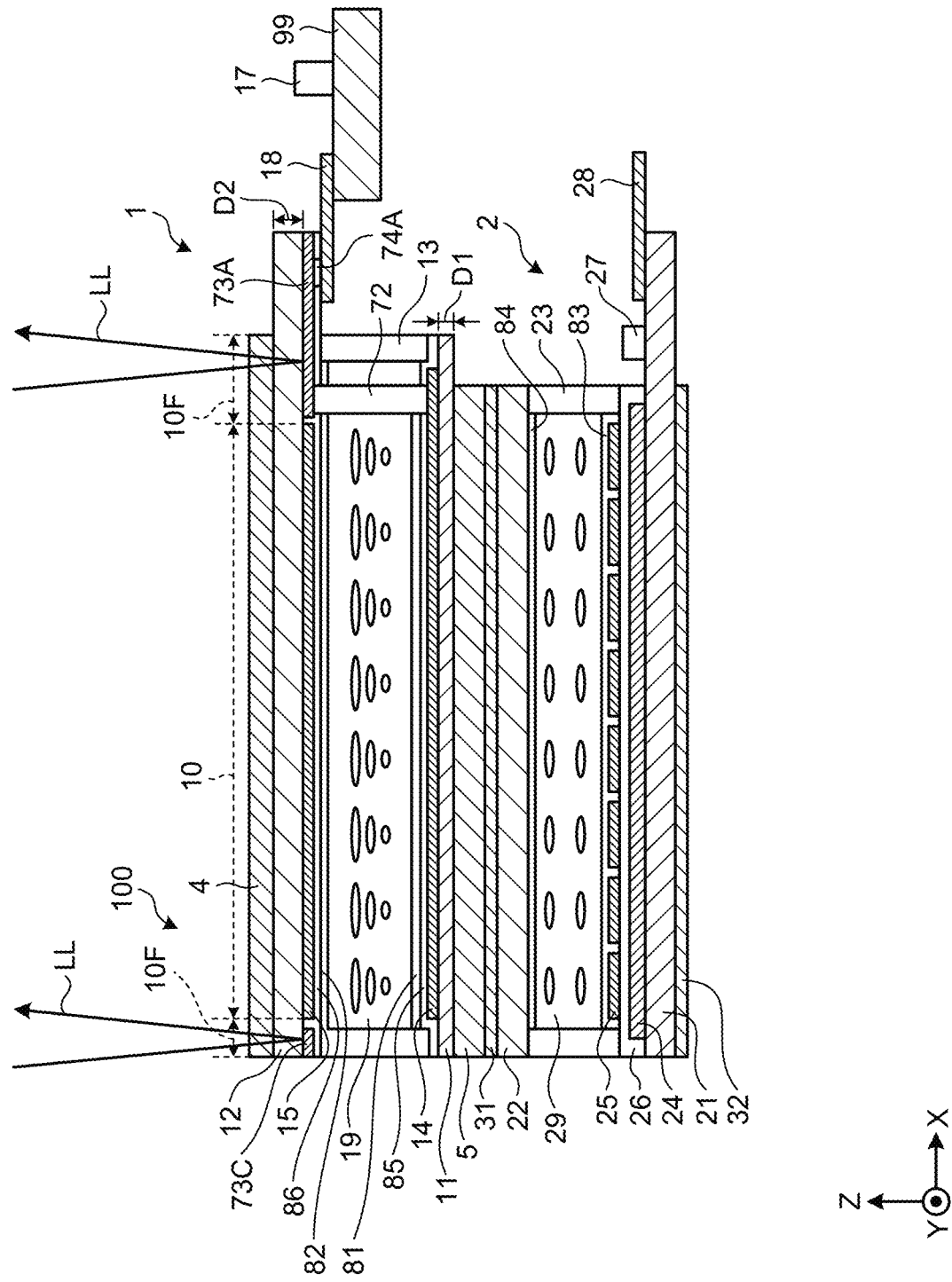
FIG. 5 is a cross-sectional view of the display device in the present embodiment.
Figure 6:
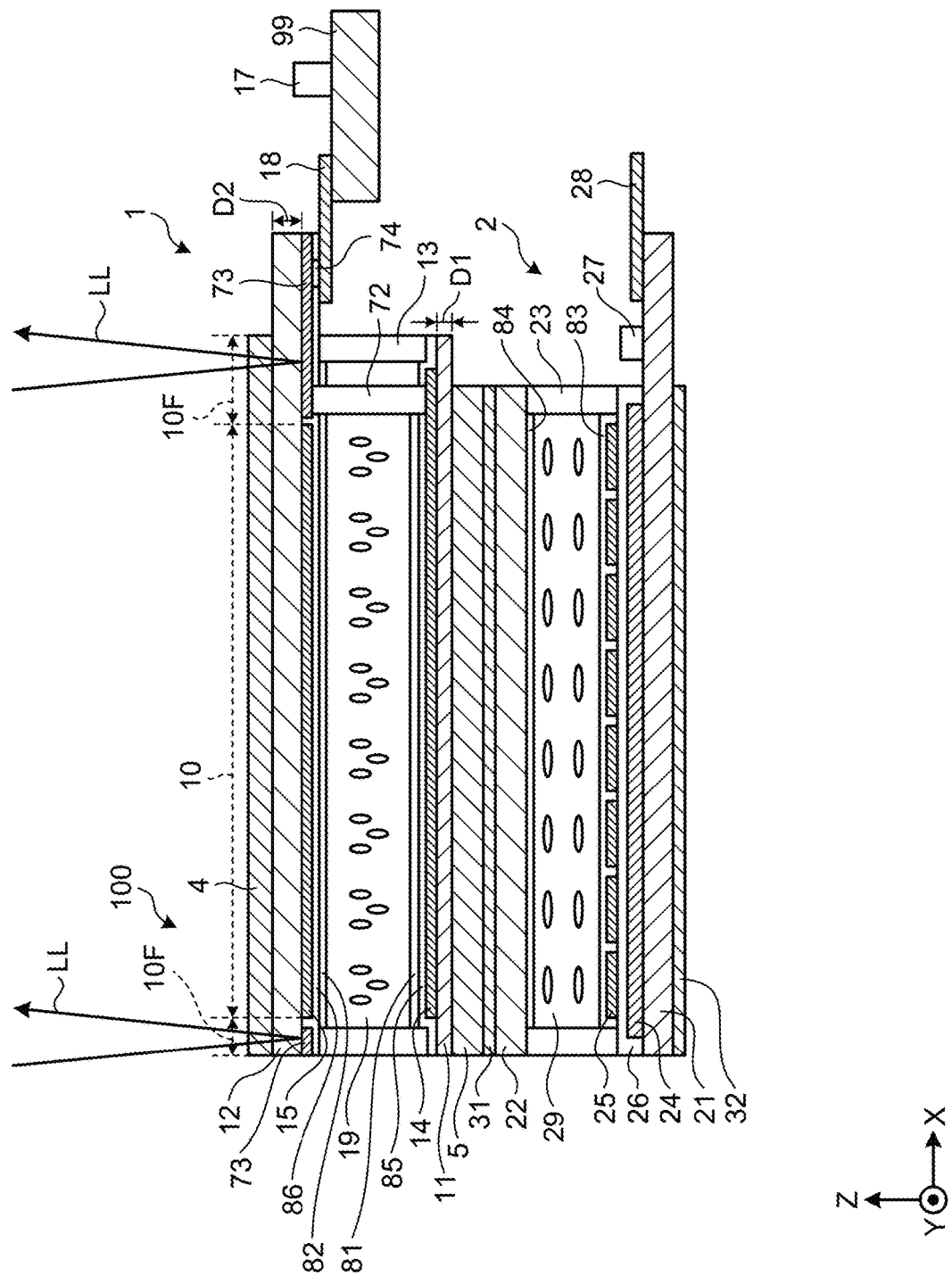
FIG. 6 is a cross-sectional view of the display device in the present embodiment.

FIG. 5 is a cross-sectional view of the display device in the present embodiment. FIG. 5 is a view illustrating the display device 100 in the display state in which an image is displayed. FIG. 6 is a cross-sectional view of the display device in the present embodiment. FIG. 6 is a view illustrating the display device 100 in the reflection state in which incident light is reflected. The cross sections in FIG. 5 and FIG. 6 are schematic cross sections cut along line V-V' illustrated in FIG. 3.

As illustrated in FIG. 5 and FIG. 6, the display panel 2 is a what-is-called liquid crystal display device. The display panel 2 includes a translucent substrate 21, a translucent substrate 22, and a liquid crystal layer 29 sealed by a sealing layer 23 between the substrate 21 and the substrate 22.

The liquid crystal layer 29 modulates light passing through the liquid crystal layer 29 in accordance with a state of an electric field. For example, a transverse electric field mode such as fringe field switching (FFS) as one mode of in-plane switching (IPS) is used for the liquid crystal layer 29 in the present embodiment. The liquid crystal layer 29 is not however limited thereto, and a longitudinal electric field mode may be used therefor. For example, liquid crystals of various modes such as liquid crystal of any of various modes such as twisted nematic (TN), virtical alignment (VA), and electrically controlled birefringence (ECB) may be used.

Figure 7:
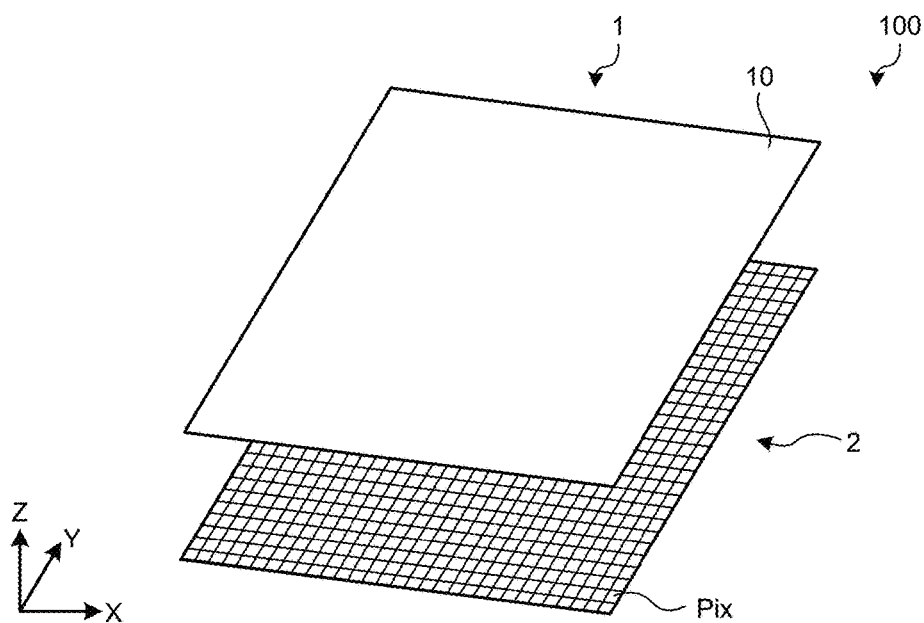
FIG. 7 is a descriptive view for schematically comparing a size of pixels of a display panel and a size of a drive electrode for explanation.

FIG. 7 is a descriptive view for schematically comparing a size of pixels of the display panel and a size of a drive electrode for explanation. The display panel 2 displays an image. As illustrated in FIG. 7, the display panel 2 includes a large number of pixels Pix arranged in a two-dimensional array. Light output from the backlight 3 (see FIG. 4) is incident on the display panel 2. The display panel 2 displays an image by changing transmissivities of light incident on respective pixels Pix.

The display device 100 in the present embodiment can be applied to both of a display device for monochrome display and a display device for color display. When the display device 100 for color display is employed, one pixel Pix (unit pixel) as a unit forming a color image includes a plurality of sub pixels. To be more specific, in the display device for color display, one pixel includes, for example, three sub pixels of a sub pixel displaying red (R), a sub pixel displaying green (G), and a sub pixel displaying blue (B).

One pixel is not limited to be configured by a combination of the sub pixels of three primary colors of RGB and can also be configured by adding one color or a plurality of colors of sub pixel(s) to the sub pixels of the three primary colors of RGB. To be more specific, one pixel can be configured by adding a sub pixel displaying white (W) for improving luminance and can also be configured by adding at least one sub pixel displaying a complementary color for enlarging a color reproduction range, for example.

A plurality of pixel electrodes 25 arranged in a matrix with a row-column configuration and a common electrode 24 are provided on the liquid crystal layer 29 side of the substrate 21 illustrated in FIG. 5 and FIG. 6. The pixel electrodes 25 and the common electrode 24 are insulated from each other by an insulating film 26 and face each other in the Z direction perpendicular to the surface of the substrate 21. The pixel electrodes 25 and the common electrode 24 are translucent electrodes made of a translucent conductive material (translucent conductive oxide) such as indium tin oxide (ITO). The substrate 21 is a translucent substrate made of glass, resin, or the like. An orientation film 83 is provided on the liquid crystal layer 29 side of the substrate 21. The third polarizing member 32 is arranged on the side of the substrate 21 that is opposite to the liquid crystal layer 29.

A color filter (not illustrated) and an orientation film 84 are provided on the liquid crystal layer 29 side of the substrate 22 illustrated in FIG. 5 and FIG. 6. The color filter includes color regions colored in three colors of red (R), green (G), and blue (B), for example. The second polarizing member 31 is arranged on the side of the substrate 22 that is opposite to the liquid crystal layer 29.

The display panel 2 includes a drive circuit 27 called a driver IC. The flexible printed circuit (FPC) 27 transmits a signal to the drive circuit 27 and drive power for driving the drive circuit 27.

As illustrated in FIG. 5 and FIG. 6, the front panel 1 includes the first substrate 11, the second substrate 12, and a liquid crystal layer 19 sealed by a sealing layer 13 between the first substrate 11 and the second substrate 12. The first substrate 11 and the second substrate 12 are translucent substrates made of glass, resin, or the like. A thickness D1 of the first substrate 11 is smaller than a thickness D2 of the second substrate 12. The thickness D2 of the second substrate 12 is 0.1 μm to 3.0 μm. The thickness D1 of the first substrate 11 will be described later.

The liquid crystal layer 19 modulates incident light passing through the liquid crystal layer 19 so as to change the polarization direction of the light in accordance with a state of an electric field. For example, the TN mode is used for the liquid crystal layer 19 in the present embodiment.

The first translucent electrode 14 having a size that is larger than the entire region of the pixels Pix arranged in a matrix with the row-column configuration illustrated in FIG. 7 is provided on the liquid crystal layer 19 side of the first substrate 11 illustrated in FIG. 5 and FIG. 6. The second translucent electrode 15 having a size that is larger than the entire region of the pixels Pix arranged in a matrix with the row-column configuration illustrated in FIG. 7 is provided on the liquid crystal layer 19 side of the second substrate 12.

As illustrated in FIG. 5 and FIG. 6, the first translucent electrode 14 is covered by a translucent insulating film 85 made of silicon nitride or the like. The second translucent electrode 15, wiring 73A, and a peripheral reflective portion 73C are covered by a translucent insulating film 86 made of silicon nitride or the like. Although not illustrated in the drawings, wiring 73B is also covered by the translucent insulating film 86 made of silicon nitride or the like. The insulating film 85 and the insulating film 86 can prevent short circuit between the second translucent electrode 15 and the first translucent electrode 14. The insulating film 86 prevents the wiring 73A, the wiring 73B, and the peripheral reflective portion 73C that are covered with the insulating film 86, from corrosion.

The first substrate 11 causes liquid crystal orientation of the liquid crystal layer 19 making contact with an orientation film 81 to be in one direction, by the orientation film 81. Similarly, the second substrate 12 causes liquid crystal orientation of the liquid crystal layer 19 making contact with an orientation film 82 to be in a direction differing from the liquid crystal orientation of the liquid crystal layer 19 making contact with the first substrate 11, by the orientation film 82.

The first translucent electrode 14 and the second translucent electrode 15 face each other in the Z direction perpendicular to the surface of the first substrate 11. The first translucent electrode 14 and the second translucent electrode 15 are made of a translucent conductive material (translucent conductive oxide) such as ITO. In the present embodiment, the first translucent electrode 14 is a drive electrode that is supplied with a variable voltage and changes a state of the liquid crystal layer 19 with an electric field. The second translucent electrode 15 is a fixed potential electrode that keeps a fixed potential with a fixed voltage.

As illustrated in FIG. 7, the area of the active region 10 is the same as the area of the display region in which all the pixels Pix are arranged.

As illustrated in FIG. 5, the flexible printed circuits (FPC) 18 and the wiring 73A on the second substrate 12 are electrically coupled to each other with a bonding pad 74A. As illustrated in FIG. 3, the wiring 73A is a part of a metal layer 73. As illustrated in FIG. 5, the wiring 73A couples a bonding pad 74 and the conductive column 72 that is electrically coupled to the first translucent electrode 14. The drive circuit 17 transmits power of the first translucent electrode 14 to the front panel 1 through the FPC 18, the wiring 73A, and the conductive column 72.

The metal layer 73 is made of aluminum, chromium, silver, or the like with metallic gloss. As illustrated in FIG. 3, the metal layer 73 has the wiring 73A, the wiring 73B, and the peripheral reflective portion 73C. The metal layer 73 is patterned, so that the wiring 73A, the wiring 73B, and the peripheral reflective portion 73C in the same layer are formed. A distance between the wiring 73A and the wiring 73B and a distance between the wiring 73A and the peripheral reflective portion 73C are 1 μm to 20 μm. Insulation is ensured by setting the distance between the wiring 73A and the wiring 73B and the distance between the wiring 73A and the peripheral reflective portion 73C to be equal to or more than 1 μm whereas slits are not easily viewed by setting the distances to be equal to or less than 20 μm. Although a distance between the wiring 73B and the peripheral reflective portion 73C is set to be 1 μm to 20 μm similarly in the present embodiment, the wiring 73B and the peripheral reflective portion 73C may be electrically coupled to each other.

As illustrated in FIG. 3, the flexible printed circuits (FPC) 18 and the wiring 73B on the second substrate 12 are electrically coupled to each other with a bonding pad 74B. The wiring 73B is electrically coupled to the second translucent electrode 15. The drive circuit 17 transmits power of the second translucent electrode 15 to the front panel 1 through the FPC 18.

The peripheral reflective portion 73C is arranged into a C shape so as to surround the active region 10 and overlaps with the frame region 10F illustrated in FIG. 1. The wiring 73A, the wiring 73B, and the peripheral reflective portion 73C have metallic gloss and therefore look like mirror surfaces when seen from a viewer side. That is to say, the wiring 73A, the wiring 73B, and the peripheral reflective portion 73C reflect light LL on the viewer side. For example, the wiring 73A and the peripheral reflective portion 73C reflect the light LL on the viewer side in FIG. 5.

The first polarizing member 4 is formed on the surface of the second substrate 12 on the opposite side to the liquid crystal layer 19.

The optical sheet 5 transmits the linearly polarized light in the first polarization direction and reflects the linearly polarized light in the second polarization direction. The optical sheet 5 is also referred to as a reflective polarizing plate.

Figure 8:
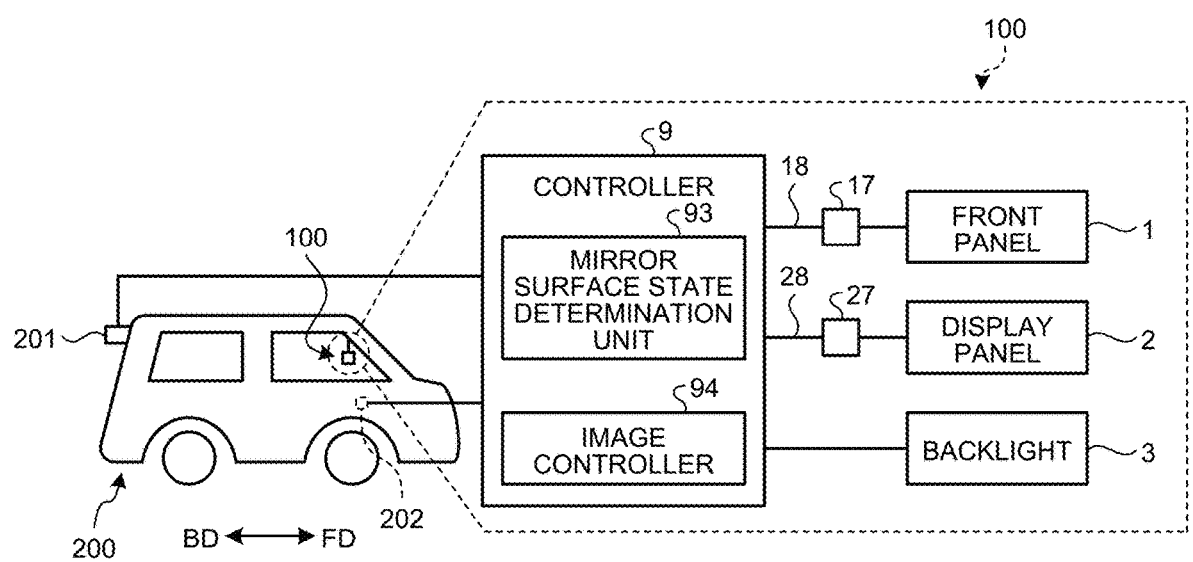
FIG. 8 is a block diagram for explaining the display device in the present embodiment.

FIG. 8 is a block diagram for explaining the display device in the present embodiment. The display device 100 in the present embodiment is used as a room mirror in a vehicle, or a mirror device, in FIG. 8. A controller 9 is a computer including a central processing unit (CPU) as an arithmetic device and a memory as a storage device, for example. The controller 9 can also implement various functions by executing a computer program using these hardware resources.

To be specific, the controller 9 loads the computer program stored in a predetermined storage unit (not illustrated) on a memory and causes the CPU to execute instructions included in the computer program loaded on the memory. The controller 9 includes a mirror surface state determination unit 93 and an image controller 94 in the present embodiment. The mirror surface state determination unit 93 and the image controller 94 are functions of the controller 9 that are implemented by executing the computer program using the hardware resources.

The image controller 94 controls lighting and extinction of the backlight 3 and the light amount and light intensity in lighting in accordance with an instruction execution result by the CPU. The image controller 94 transmits an image signal to be displayed on the display panel 2 to the drive circuit 27 through a flexible printed circuits 28 in accordance with the instruction execution result by the CPU, and the drive circuit 27 displays an image on the display panel 2. The mirror surface state determination unit 93 controls the drive circuit 17 through the FPC 18 in accordance with an instruction signal of the display state on an input unit 202 to bring a state in which the drive circuit 17 applies a voltage to the first translucent electrode 14. The voltage to the first translucent electrode 14 thereby becomes equal to or higher than a threshold. Alternatively, the mirror surface state determination unit 93 controls the drive circuit 17 through the FPC 18 in accordance with an instruction signal of the reflection state on the input unit 202 to bring a state in which the drive circuit 17 applies no voltage to the first translucent electrode 14. The applied voltage to the first translucent electrode 14 thereby becomes lower than the threshold.

For example, the controller 9 is coupled to a shooting device 201 of a vehicle 200, as illustrated in FIG. 8. The shooting device 201 shoots a rear part BD of the vehicle 200, and an image of the rear part BD of the vehicle 200 is transmitted to the controller 9. The display device 100 displays the image of the rear part BD of the vehicle 200 in the display state. A position at which the shooting device 201 is mounted on the vehicle may be a position enabling shooting of a front part FD of the vehicle 200 or a position enabling shooting of the surrounding of the vehicle 200.

Figure 9:
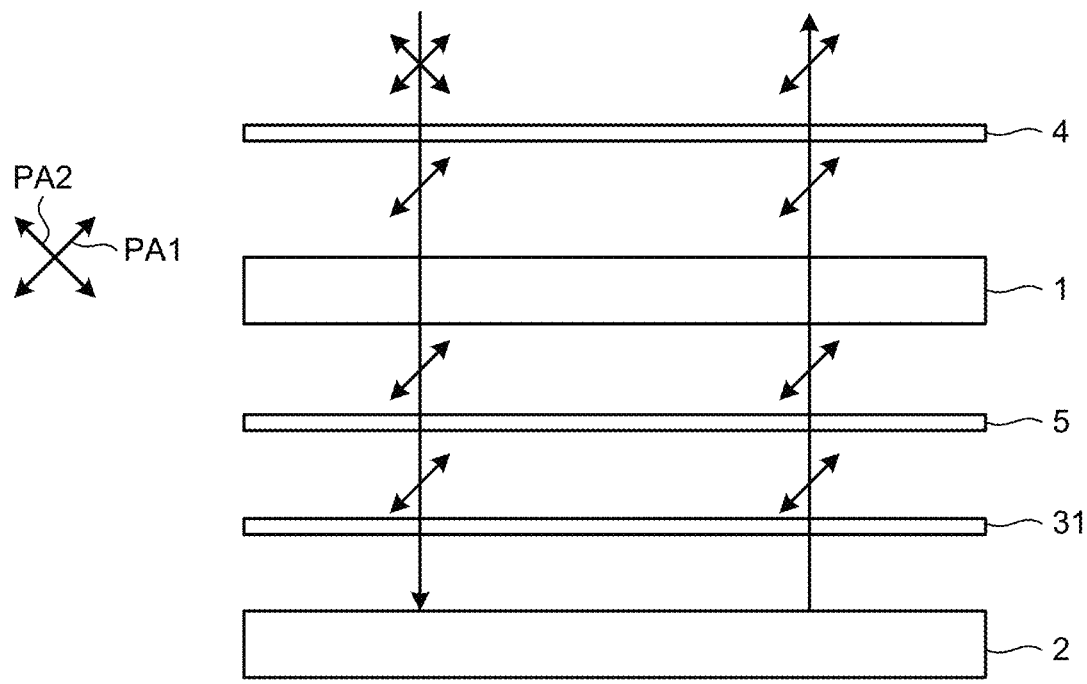
FIG. 9 is a schematic view for explaining a transmission state in which incident light is transmitted and a display state in which an image is able to be displayed.

FIG. 9 is a schematic view for explaining a transmission state in which incident light is transmitted and the display state in which an image is able to be displayed. As illustrated in FIG. 9, the first polarizing member 4 absorbs linearly polarized light in a second polarization direction PA2 orthogonal to a first polarization direction PA1.

The linearly polarized light in the first polarization direction PA1 passes through the first polarizing member 4 and is incident on the front panel 1. As illustrated in FIG. 6, the front panel 1 is in a state in which the drive circuit 17 applies a voltage to the first translucent electrode 14. The front panel 1 thereby outputs the linearly polarized light in the first polarization direction PA1 that has been incident from the first polarizing member 4 to the optical sheet 5 while keeping the linearly polarized light in the first polarization direction PA1.

When the display panel 2 displays an image, the first polarizing member 4, the front panel 1, and the optical sheet 5 are brought into a state of opening a shutter for the linearly polarized light in the first polarization direction PA1, so that the image is easy to be viewed. The linearly polarized light in the first polarization direction PA1 that has been incident from the front panel 1 passes through the optical sheet 5. The second polarizing member 31 transmits the linearly polarized light in the first polarization direction PA1. As described above, the image on the display panel 2 can be viewed from the display surface side of the first polarizing member 4.

The display panel 2 outputs the image with the linearly polarized light in the first polarization direction PA1 through the second polarizing member 31. The optical sheet 5 transmits the linearly polarized light in the first polarization direction PA1 that has been incident from the display panel 2.

The front panel 1 outputs the linearly polarized light in the first polarization direction PA1 that has been incident from the optical sheet 5 to the first polarizing member 4 while keeping the linearly polarized light in the first polarization direction PA1.

The linearly polarized light in the first polarization direction PA1 passes through the first polarizing member 4 and is output, as an image, to the display surface side of the first polarizing member 4.

As described above, when the mirror surface state determination unit 93 illustrated in FIG. 8 receives the instruction signal of the transmission state on the input unit 202, the drive circuit 17 operates so as to bring the transmission state in which the incident light is transmitted. The image controller 94 controls the backlight 3 and the display panel 2 to display an image on the display panel 2.

Figure 10:
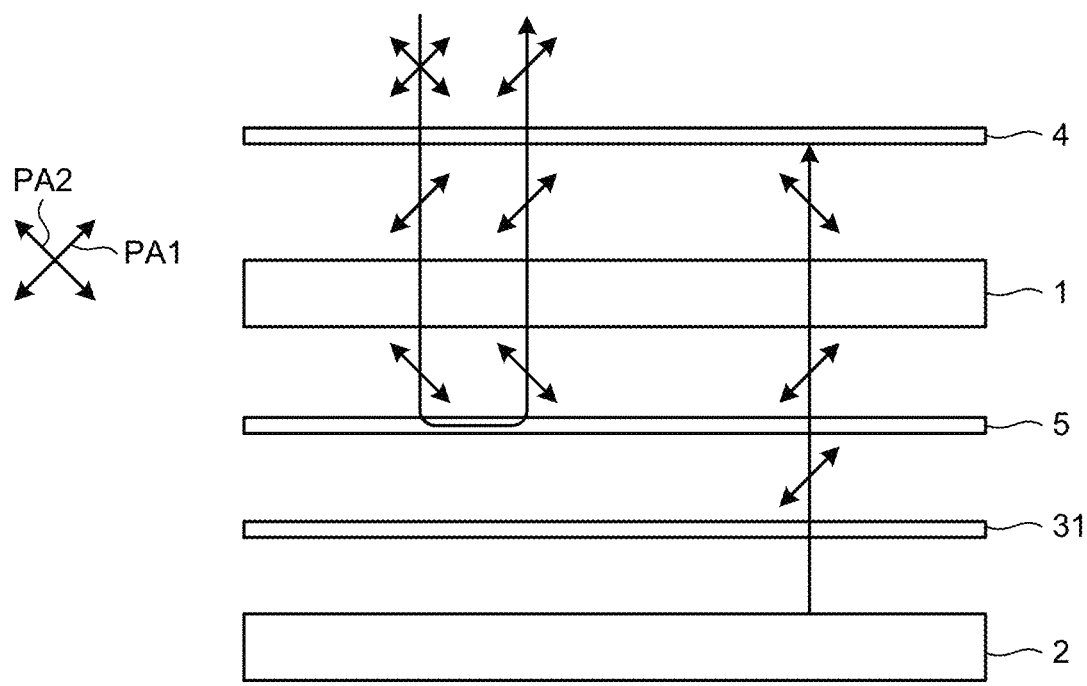
FIG. 10 is a schematic view for explaining a reflection state in which the incident light is reflected.

FIG. 10 is a schematic view for explaining the reflection state in which the incident light is reflected. As illustrated in FIG. 10, the first polarizing member 4 absorbs the linearly polarized light in the second polarization direction PA2 orthogonal to the first polarization direction PA1.

The linearly polarized light in the first polarization direction PA1 passes through the first polarizing member 4 and is incident on the front panel 1. As illustrated in FIG. 5, the front panel 1 is in a state in which the drive circuit 17 applies no voltage to the first translucent electrode 14. The front panel 1 thereby converts the linearly polarized light in the first polarization direction PA1 that has been incident from the first polarizing member 4 into the linearly polarized light in the second polarization direction PA2 and outputs it to the optical sheet 5.

The optical sheet 5 reflects the linearly polarized light in the second polarization direction PA2 that has been incident from the front panel 1.

The linearly polarized light in the second polarization direction PA2 that has been reflected by the optical sheet 5 is incident on the front panel 1. The front panel 1 converts the linearly polarized light in the second polarization direction PA2 that has been incident from the optical sheet 5 into the linearly polarized light in the first polarization direction PA1 and outputs it to the first polarizing member 4.

The linearly polarized light in the first polarization direction PA1 from the front panel 1 passes through the first polarizing member 4, and an image on the display surface side of the first polarizing member 4 is displayed like a mirror surface when seen from the display surface side of the first polarizing member 4.

Even when the display panel 2 displays an image, the first polarizing member 4, the front panel 1, and the optical sheet 5 are brought into a state of closing the shutter for the linearly polarized light in the second polarization direction PA2 provided by converting the linearly polarized light in the first polarization direction PA1 that has been output from the display panel 2. As a result, the image is not easily viewed.

To be specific, the display panel 2 outputs the image with the linearly polarized light in the first polarization direction PA1 through the second polarizing member 31.

The optical sheet 5 transmits the linearly polarized light in the first polarization direction PA1 that has been incident from the display panel 2.

The front panel 1 converts the linearly polarized light in the first polarization direction PA1 that has been incident from the optical sheet 5 into the linearly polarized light in the second polarization direction PA2 and outputs it to the first polarizing member 4.

The first polarizing member 4 absorbs the linearly polarized light in the second polarization direction PA2, and the image is not easily viewed on the display surface side of the first polarizing member 4.

As described above, when the mirror surface state determination unit 93 illustrated in FIG. 8 receives the instruction signal of the reflection state on the input unit 202, the drive circuit 17 operates so as to bring the reflection state in which the incident light is reflected. In the reflection state, the image is not easily viewed even when the image is displayed on the display panel 2. The image controller 94 therefore controls to display no image on the display panel 2 when the mirror surface state determination unit 93 illustrated in FIG. 8 receives the instruction signal of the reflection state on the input unit 202.

Figure 11:
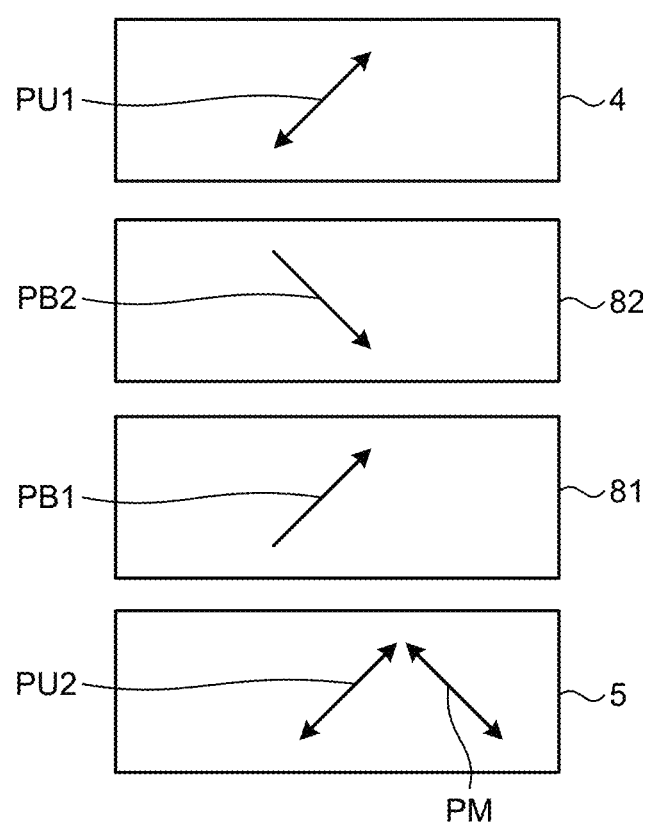
FIG. 11 is a descriptive view for schematically explaining a relation between a transmission axis of a first polarizing member and a transmission axis of an optical sheet.

FIG. 11 is a descriptive view for schematically explaining a relation between a transmission axis of the first polarizing member and a transmission axis of the optical sheet. FIG. 11 indicates a transmission axis direction PU1 of the first polarizing member 4, a rubbing direction PB2 of the orientation film 82, a rubbing direction PB1 of the orientation film 81, a transmission axis direction PU2 of the optical sheet 5, and a reflection axis direction PM of the optical sheet 5.

As illustrated in FIG. 11, the rubbing direction PB2 of the orientation film 82 and the rubbing direction PB1 of the orientation film 81 intersect with each other when seen from above. The transmission axis direction PU1 of the first polarizing member 4 and the transmission axis direction PU2 of the optical sheet 5 are parallel with each other. The transmission axis direction PU1 of the first polarizing member 4 and the reflection axis direction PM of the optical sheet 5 intersect with each other. With this configuration, the first polarizing member 4 and the optical sheet 5 transmit the linearly polarized light in the first polarization direction PA1.

Figure 12:
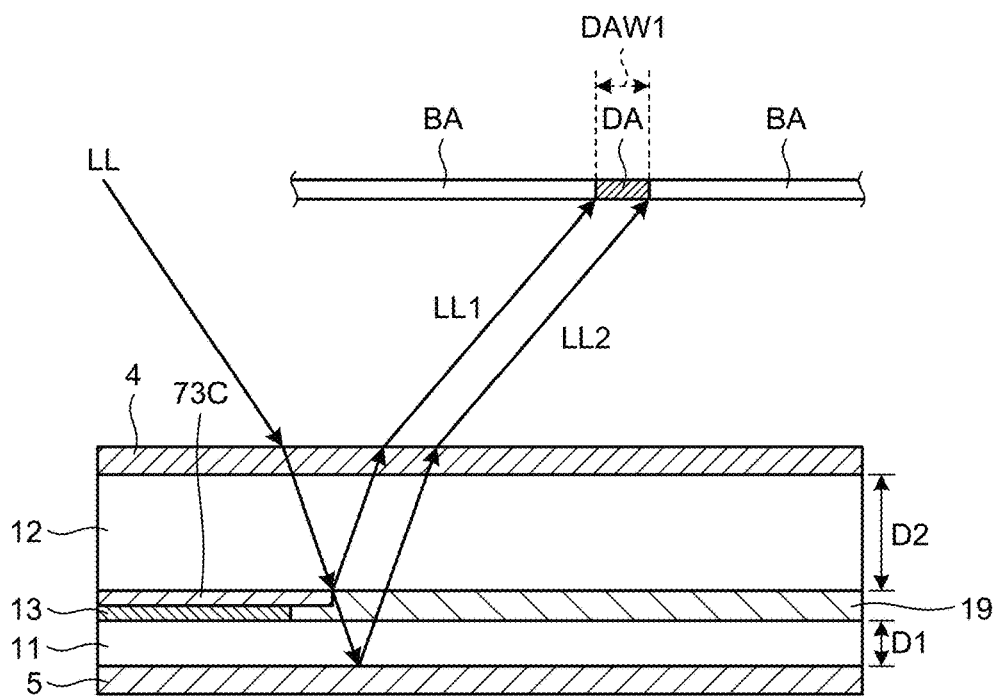
FIG. 12 is a descriptive view schematically illustrating a dark part in a mirror surface state in the present embodiment.
Figure 13:
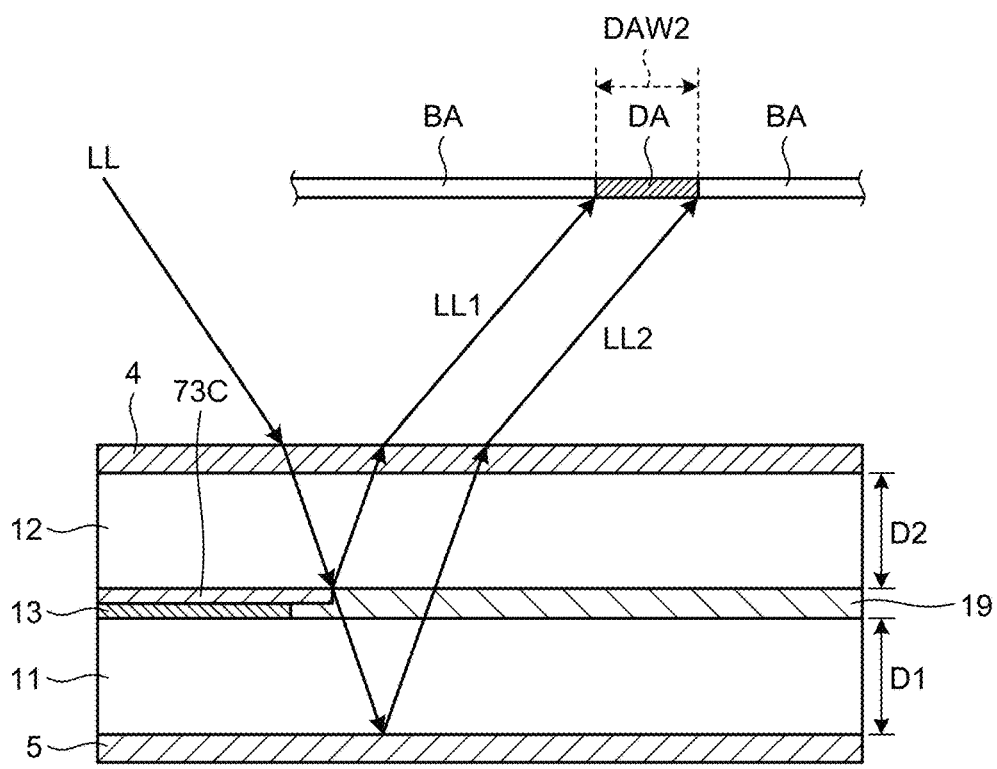
FIG. 13 is a descriptive view schematically illustrating a dark part in a mirror surface state in a comparative example.

FIG. 12 is a descriptive view schematically illustrating a dark part in a mirror surface state in the present embodiment. FIG. 13 is a descriptive view schematically illustrating a dark part in a mirror surface state in a comparative example. As illustrated in FIG. 12 and FIG. 13, the peripheral reflective portion 73C reflects light LL on the viewer side as light LL1. For example, similarly to the above description with reference to FIG. 10, the light LL on the viewer side that is incident light is reflected as light LL2 also in FIG. 12 and FIG. 13. A dark part DA is sometimes viewed between a bright part BA and a bright part BA when seen from the observer side.

The dark part DA is desirably unnoticeable because the dark part DA gives uncomfortable feeling to the viewer. The thickness D1 of the first substrate 11 is smaller than the thickness D2 of the second substrate 12 in FIG. 12. The thickness D1 of the first substrate 11 is the same as the thickness D2 of the second substrate 12 in FIG. 13. A boundary width DAW1 between the boundaries of the dark part DA and the bright parts BA that is illustrated in FIG. 12 is thereby smaller than a boundary width DAW2 between the boundaries of the dark part DA and the bright parts BA that is illustrated in FIG. 13. As a result, the dark part DA is unnoticeable.

Figure 14:
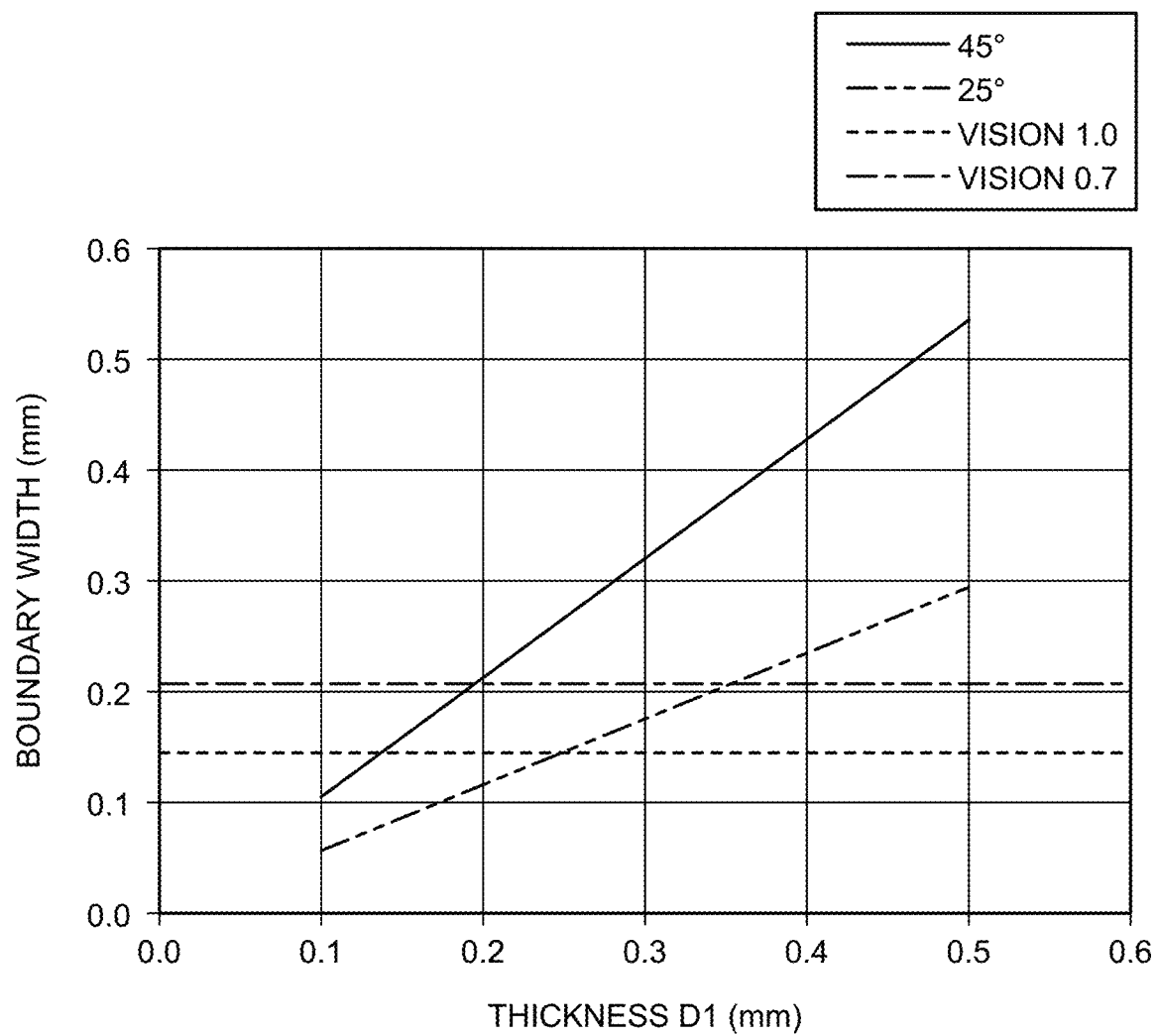
FIG. 14 is a descriptive view for explaining a relation between a boundary width between boundaries of the dark part and bright parts and the thickness of a first substrate.
Figure 15:
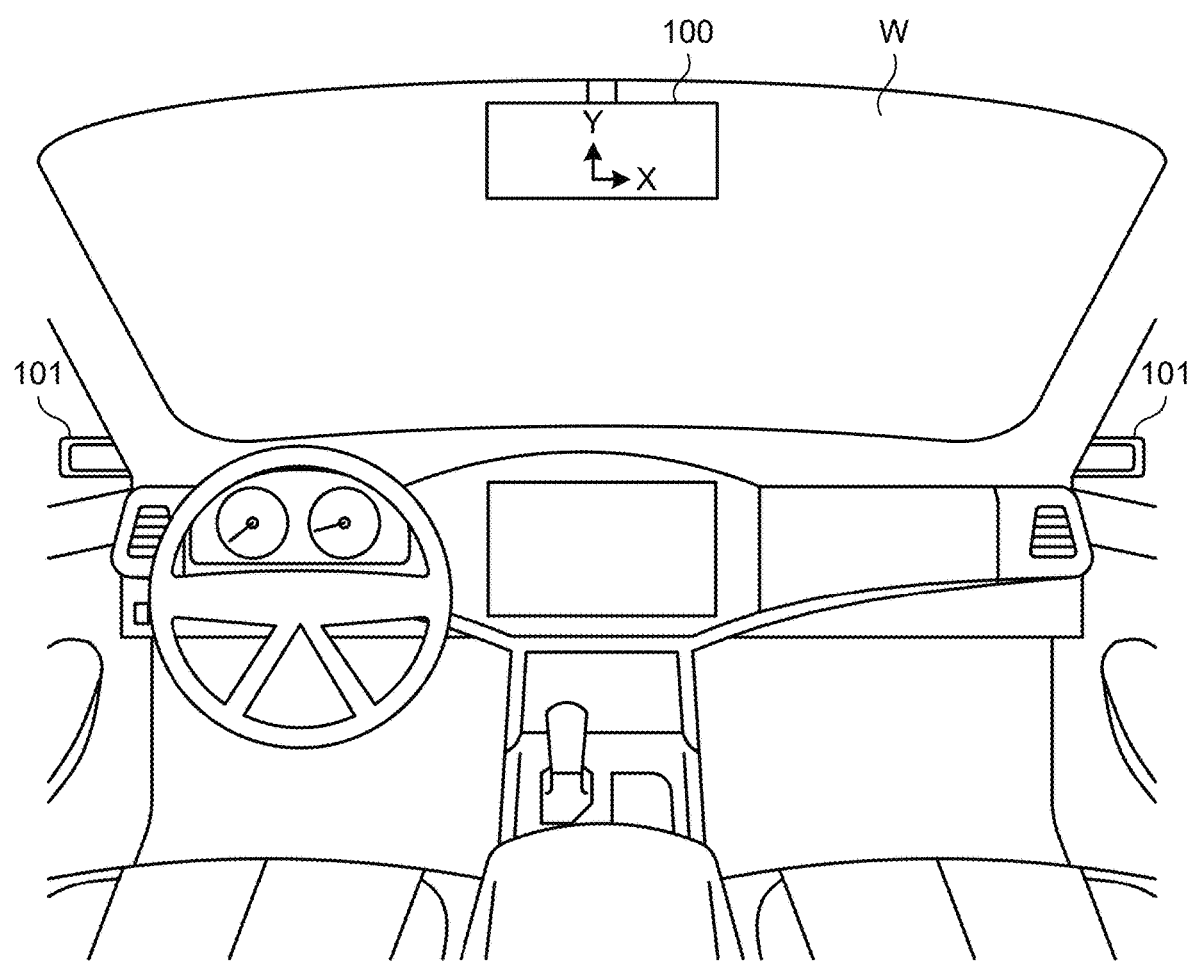
FIG. 15 is a view illustrating a mounting state of a mirror device.

FIG. 14 is a descriptive view for explaining a relation between the boundary width between the boundaries of the dark part and the bright parts and the thickness of the first substrate. FIG. 15 is a view illustrating a mounting state of a mirror device. In FIG. 14, the first substrate 11 is made of glass having a refractive index of 1.51. Here, it is assumed that the display device 100 is used as a room mirror, which will be described later. A distance between the display device 100 and the observer is 500 mm. When observation angles at which the observer views with respect to the surface (XY plane in FIG. 15) of the display device 100 are 45° and 25°, the boundary widths DAW1 between the boundaries of the dark part DA and the bright parts BA with which the observer having the vision of 1.0 can view the dark part DA in accordance with the thickness D1 of the first substrate 11 are calculated. Similarly, when the observation angles at which the observer views with respect to the surface (XY plane in FIG. 15) of the display device 100 are 45° and 25°, the boundary widths DAW1 between the boundaries of the dark part DA and the bright parts BA with which the observer having the vision of 0.7 can view the dark part DA in accordance with the thickness D1 of the first substrate 11 are calculated. The vision in this example is a value of a visual acuity chart using a Landolt ring.

In FIG. 15, the display device 100 in the present embodiment is used as a room mirror arranged in an upper center portion of a window W. The mirror device is brought into the reflection state in which incident light is reflected and the transmission state in which the incident light is transmitted and an image is able to be displayed.

When an applied voltage to the first translucent electrode 14 is lower than the threshold, the reflection state in which the incident light is reflected is made, and the display device 100 serves as a mirror that mirror-reflects the incident light from a rear part of the vehicle and enables the rear part of the vehicle to be viewed. The controller 9 illustrated in FIG. 8 does not display an image of the rear part BD of the vehicle 200 on the display panel 2 in the reflection state.

The display panel 2 of the display device 100 displays an image of the rear part that has been shot by the shooting device 201 (see FIG. 8) in the display state. Alternatively, the display panel 2 of the display device 100 may display an image around the vehicle that has been shot by a shooting device in the display state.

As described above, a reflectivity measurement angle of 25° is often used for measurement of the mirror device to be used (JIS D5705). When the first substrate 11 is made of glass and the thickness D1 of the first substrate 11 is equal to or smaller than 0.35 mm, the boundary width DAW1 between the boundaries of the dark part DA and the bright parts BA is hardly viewed based on a relation between the observation angle of 25° and the vision of 0.7 required for acquisition of a class 1 driver's license of Japan, the relation being illustrated in FIG. 14.

In order to make the boundary width DAW1 between the boundaries of the dark part DA and the bright parts BA be hardly viewed, the first substrate 11 may be made of glass and the thickness D1 of the first substrate 11 may be set to be equal to or smaller than 0.25 mm based on the relation between the observation angle of 25° and the vision of 1.0, the relation being illustrated in FIG. 14.

The case in which the first substrate 11 is made of resin is also examined by simulation. When the first substrate 11 is made of polyimide resin, the refractive index thereof is 1.63. In the case where the first substrate 11 is made of resin having the refractive index of 1.63, the observation angle is 25°, and the vision is 0.7, it is found that the boundary width DAW1 between the boundaries of the dark part DA and the bright parts BA is hardly viewed when the thickness of the first substrate 11 is equal to or smaller than 0.4 mm.

When the first substrate 11 is made of poly tetra fluoro ethylene (PTFE) resin, the refractive index thereof is 1.35. In the case where the first substrate 11 is made of resin having the refractive index of 1.53, the observation angle is 25°, and the vision is 0.7, it is found that the boundary width DAW1 between the boundaries of the dark part DA and the bright parts BA is hardly viewed when the thickness of the first substrate 11 is equal to or smaller than 0.32 mm.

When the first substrate 11 is made of polyimide resin, the thickness D1 of the first substrate 11 that can be used as the front panel 1 needs to be at least equal to or larger than 10

μm. When the thickness D1 of the first substrate 11 is smaller than 10 μm, display failures such as unevenness or failures in a manufacturing process can occur.

The display device 100 in the present embodiment may be applied to a side mirror 101 of the vehicle. Although the side mirror 101 of the vehicle is arranged outside the vehicle, it may be arranged in the vehicle.

As described above, the display device 100 includes the display panel 2 and the front panel 1 overlapping with the display panel 2. The display device 100 further includes the first polarizing member 4, the optical sheet 5, and the second polarizing member 31. The first polarizing member 4 absorbs the linearly polarized light in the second polarization direction PA2 orthogonal to the first polarization direction PA1. The optical sheet 5 reflects the linearly polarized light in the second polarization direction PA2 and transmits the linearly polarized light in the first polarization direction PA1. The front panel 1 can convert the polarization direction of the incident light into another polarization direction in accordance with the applied voltage. The front panel 1 is arranged between the first polarizing member 4 and the optical sheet 5. The display panel 2 overlaps with the front panel 1 in the Z direction with the second polarizing member 31 interposed between the optical sheet 5 and the display panel 2, the second polarizing member 31 transmitting the linearly polarized light in the second polarization direction PA2. The active region 10 can thereby be switched between the display state in which an image is displayed, which is illustrated in FIG. 6 and FIG. 9, and the mirror state (reflection state) in which a reflected image is provided, which is illustrated in FIG. 5 and FIG. 10.

The front panel 1 is located to be closer to an observer than the display panel 2. The front panel 1 is a panel that can be switched into either of a first front panel state of outputting the incident linearly polarized light in the first polarization direction PA1 while keeping the linearly polarized light in the first polarization direction PA1 and a second front panel state of converting the incident linearly polarized light in the first polarization direction PA1 into the linearly polarized light in the second polarization direction PA2 and outputting it in accordance with a state in which the drive circuit 17 applies a voltage to the first translucent electrode 14.

The active region 10 is thereby brought into the reflection state in the first front panel state whereas the active region 10 is brought into the display state in the second front panel state. Power consumption in the reflection state is smaller than power consumption in the display state. In other words, when the applied voltage is lower than the threshold, the incident light is reflected in the display device 100. As a result, the power consumption in the reflection state can be reduced in the display device 100.

In the present embodiment, the frame region 10F around the active region 10 is a mirror surface. When the active region 10 is in the reflection state, the active region 10 and the frame region 10F reflect light, and the area of the mirror surface therefore becomes larger than that in the active region 10.

The metal layer 73 having metallic gloss is arranged in the frame region 10F, and the frame region 10F is the mirror surface when seen from the observer side. As illustrated in FIG. 1, in the display device 100 in the present embodiment, when the active region 10 is brought into the reflection state, the frame region 10F is also in the reflection state, and the area of the mirror surface therefore seems to be increased.

In the display device 100 in the present embodiment, when the active region 10 is brought into the display state, the frame region 10F is still in the reflection state, and an image is displayed in a region framed by the mirror surface with the frame region 10F.

As described above, the front panel 1 includes the first substrate 11 and the second substrate 12 located on the opposite side of the first substrate 11 with respect to the display panel 2. The metal layer 73 is arranged in the frame region 10F of the second substrate 12. The thickness D1 of the first substrate 11 is equal to or smaller than 0.4 mm. With this configuration, a parallax between the light LL1 and the light LL2 is decreased, so that the boundary width DAW1 between the boundaries of the dark part DA and the bright parts BA becomes hardly viewed.

The thickness D1 of the first substrate 11 is smaller than the thickness D2 of the second substrate 12. With these thicknesses, the thickness D2 of the second substrate 12 can prevent deflection of a front plate while reducing the parallax between the light LL1 and the light LL2 due to the metal layer 73 and the thickness D1 of the first substrate 11.

The liquid crystal layer 19 is sealed between the first substrate 11 and the second substrate 12. The first translucent electrode 14 is provided on the liquid crystal layer 19 side of the first substrate 11. The second translucent electrode 15 is provided on the liquid crystal layer 19 side of the second substrate 12. The metal layer 73 is provided on the second substrate 12. The metal layer 73 is therefore closer to the observer than the sealing layer 13, so that lowering of the reflectivity by the sealing layer 13 can be prevented.

Although the preferred embodiment of the present disclosure has been described above, the present disclosure is not limited by the embodiment. For example, the present disclosure is not limited to be applied to the mirror device used in the vehicle and can be applied also to a mirror such as a general full-length mirror. Although the boundary of the active region is linear, it is not particularly limited and may have a curved shape or a character shape formed by combining curves, or the like. Contents disclosed in the embodiment are merely examples, and various modifications can be made in a range without departing from the gist of the present disclosure. Appropriate modifications in a range without departing from the gist of the present disclosure naturally belong to the technical scope of the present disclosure. For example, translucent optical resin or any of various films that does not inhibit actions provided by the aspect described in the present embodiment may be provided between components of the first polarizing member 4, the optical sheet 5, the front panel 1, the second polarizing member 31, and the display panel 2 in the above-mentioned embodiment.

The following configuration may also be employed. That is, the drive circuit 17 applies a fixed voltage to the first translucent electrode 14, and the first front panel state and the second front panel state as described above are switched in accordance with whether the drive circuit 17 applies the voltage to the first translucent electrode 14.

Other operation and effect provided by the aspect described in the present embodiment that are obvious from description of the present specification or at which those skilled in the art can arrive as appropriate should be interpreted to be provided by the present disclosure.

What is claimed is:
1. A display device comprising:
a display panel;
a front panel overlapping with the display panel;
a liquid crystal layer sealed between the first substrate and the second substrate;

a first translucent electrode provided on a side of the first substrate on which the liquid crystal layer is located; and a second translucent electrode provided on a side of the second substrate on which the liquid crystal layer is located, wherein the front panel includes:
  a first substrate; and
  a second substrate located on an opposite side of the first substrate with respect to the display panel, the front panel has an active region capable of being switched between a display state in which an image is displayed and a reflection state in which a reflected image is provided, and a frame region around the active region, a metal layer is arranged in the frame region of the second substrate, a thickness of the first substrate is equal to or smaller than 0.4 mm, and the metal layer includes a peripheral reflective portion around the second translucent electrode and wiring for supplying electric power to the first translucent electrode or the second translucent electrode.

2. A display device comprising:
a display panel;
a front panel overlapping with the display panel;
a liquid crystal layer sealed between the first substrate and the second substrate;
a first translucent electrode provided on a side of the first substrate on which the liquid crystal layer is located; and
a second translucent electrode provided on a side of the second substrate on which the liquid crystal layer is located, wherein
the front panel includes:
  a first substrate; and
  a second substrate located on an opposite side of the first substrate with respect to the display panel,
the front panel has an active region capable of being switched between a display state in which an image is displayed and a reflection state in which a reflected image is provided, and a frame region around the active region,
a metal layer is arranged in the frame region of the second substrate,
a thickness of the first substrate is smaller than a thickness of the second substrate, and
the metal layer includes a peripheral reflective portion around the second translucent electrode and wiring for supplying electric power to the first translucent electrode or the second translucent electrode.

3. The display device according to claim 1, wherein
the first substrate is made of glass, and
a thickness of the first substrate is equal to or smaller than 0.35 mm.

4. The display device according to claim 1, wherein
the first substrate is made of resin.

5. A mirror device that is brought into a reflection state in which incident light is reflected and a transmission state in which incident light is transmitted and an image is able to be displayed, the mirror device comprising:
the display device according to claim 1; and
a shooting device shooting an image of a rear part of a vehicle.

6. The display device according to claim 2, wherein
the first substrate is made of glass, and
a thickness of the first substrate is equal to or smaller than 0.35 mm.

7. The display device according to claim 2, wherein
the first substrate is made of resin, and
a thickness of the first substrate is equal to or smaller than 0.40 mm.

8. A mirror device that is brought into a reflection state in which incident light is reflected and a transmission state in which incident light is transmitted and an image is able to be displayed, the mirror device comprising:
the display device according to claim 2; and
a shooting device shooting an image of a rear part of a vehicle.

* * * * *